CODE DETECTING SYSTEM
Filed Nov. 15, 1955
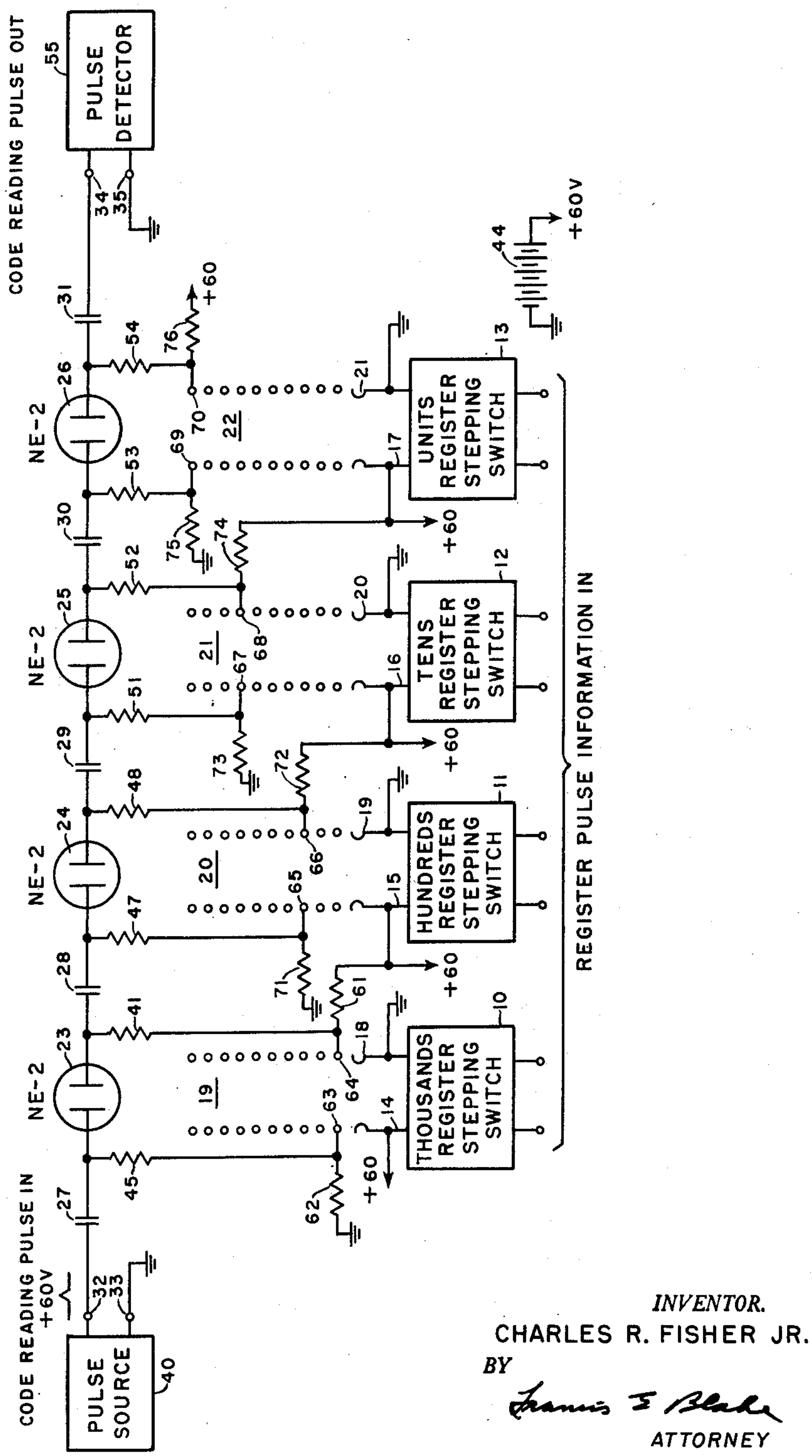
INVENTOR.
CHARLES R. FISHER JR.
BY
Francis E. Blake
ATTORNEY United States Patent Office 2,787,781
Patented Apr. 2, 1957

2,787,781

CODE DETECTING SYSTEM

Charles R. Fisher, Jr., Rochester, N. Y., assignor to General Dynamics Corporation, a corporation of Delaware Application November 15, 1955, Serial No. 546,957
5 Claims. (Cl. 340—173)

The present invention relates to a code detecting system and more particularly to an electronic code detecting system especially useful for detecting a condition or conditions representing a multi-character code and is an improvement of the code detecting system shown in the copending patent application of Frank A. Morris, filed November 15, 1955, Serial No. 546,947.

For many reasons, it often is necessary to initiate a function as a result of detecting the registration of a multi-character code in a suitable registration system. Often the multi-character code to be detected will be registered randomly and interspersed among many other registrations of multi-character codes of which there is no desire to detect. For example, the nationwide toll dialing systems now being built may often require the recognition of certain area and office code combinations for purposes of routing the call and determining rates to be applied. In such systems, the office and area code may be in the form of electrical impulses representing digit values. Assuming a four digit code, only a few of the possible many different codes would be required to be detected.

In the above mentioned copending patent application, a code detecting system having a plurality of serially connected controllable conducting devices such as gas tube diodes has been specifically disclosed. One each of the diodes is provided for each character of the code to be detected. A code reading pulse is applied to the input terminals of the network of serially connected diodes but such pulse is of insufficient voltage amplitude to cause the first diode to conduct unless such diode has been additionally biased to thereby produce sufficient voltage across the diode to become conductive. The application of the bias voltage to the respective diode is controlled in accordance with the registration of a particular character of the code.

It is an object of this invention to provide an improved code detecting system having the general arrangement described above and having additional means to additionally assure the non-conduction of a code reading pulse and prevent the false indication of a code character registration in the absence of registration of such character.

Further objects and advantages of the invention will be apparent with reference to the following specification and drawing in which the sole figure is a schematic wiring diagram with certain well known elements shown in block outline only.

Referring to the drawing, the invention will be specifically described in connection with a form thereof adapted to detect the registration of a four character code in which each code character may be a digit represented by a like number of electrical impulses. Obviously the invention may be used with any number of code characters and the code characters may themselves be in any form suitable for registration by conventional registration means. In order to simplify the description of the present invention, the code registers are shown as electric stepping switches 10, 11, 12 and 13, one each for the respective thousands, hundreds, tens and units digits of the four digit code to be registered and detected. The stepping switches 10—13 may be of any conventional form wherein each is provided with two sets of brushes 14—17 and 18—21, respectively, to be simultaneously stepped into engagement with sets of contact banks, generally shown at 19—22, respectively, in response to each electric impulse connected thereto in a series of impulses for each digit. The sources of the code character electrical impulses are not shown and it should be understood that they may be obtained in any suitable manner. Of course, electronic counting tube register circuits or the like may be used instead of the stepping switches as shown, and the code may be registered in various manners such as by decimal or binary methods or the like.

Controllable conducting devices 23—26 are connected in series with coupling condensers 27—31 between input terminals 32, 33 and output terminals 34, 35. The controllable conducting devices 23—26, for purposes of the present description, are shown to be the commercially available neon diode gas tubes of the type identified as NE-2. A characteristic of such neon diode is that a minimum threshold voltage of about eighty volts amplitude must be applied across the respective pair of electrodes of the diode before the diode will become conductive by ionization of its gas content. Obviously, any other form of controllable conducting device which requires a minimum threshold voltage before allowing conduction may be used in place of the NE-2 type of neon diode gas tubes specifically described.

A source of code reading pulses having, for example, an amplitude of plus sixty volts is shown at 40 to be connected to the input terminals 32 and 33 with the terminal 33 grounded. The arrangement is such that the code reading pulse from the pulse source 40 may be connected through the coupling condenser 27 and across the neon diode 23. However, as previously mentioned, a minimum threshold voltage of about eighty volts is required to cause the neon diode 22 to become conductive and therefore the connection of only a code reading pulse having a sixty volt amplitude from the pulse source 40 will not cause the diode 23 to conduct and its passage to the output terminals 34, 35 will be blocked.

Furthermore, according to the present invention, a bias voltage of approximately sixty volts amplitude and having a polarity opposite to the polarity of the code reading pulse source 40 is normally connected across the diode 23 by means of the resistors 61, 41, 45 and 62 which are connected as shown to the bias voltage source 44. This bias voltage of reverse polarity to the polarity of the reading pulse source 40 will subtract from the amplitude of the reading pulse to further assure that the read pulse will not cause the diode 23 to become conductive.

Assuming that a code character digit "1" representing the thousands digit has been registered in the thousands registration switch 10, the stepping switch brushes 14 and 18 will be resting on the stepping switch terminal bank contacts 63 and 64. It will be noted that each of the stepping switch brushes 14—17 is connected to the positive terminal of the sixty volt bias source shown as a direct current battery 44 whose negative terminal is connected to ground while the brushes 18—21 are connected to the grounded negative terminal of the bias source 44. Although the bias source 44 is stated to have a potential of about sixty volts, it should be understood that its potential may be of any value lower than the minimum threshold voltage for the diodes 23—26 and not less than a value that will add to the value of the read pulse voltage to equal or exceed the threshold voltage. Therefore, with the stepping brushes 14 and 18 resting on the stepping switch terminals 63 and 64, a sixty volt bias will be connected through the pulse isolating resistors 41 and 45 and across the pair of electrodes of the neon diode gate tube 22 with a polarity which is the same as the polarity of the read pulses to be applied. Under such conditions, the application of a code reading pulse also having a sixty volt amplitude from the pulse source 40 will add to the bias voltage across the pair of electrodes of the neon diode gate 23 and equal the threshold voltage of diode 23 to cause such diode to become conductive to thereby transmit the code reading pulse through the coupling condenser 28 to the electrodes of the next neon diode tube gate 24 that is associated with the hundreds stepping switch 11.

The amplitude of the pulse as transmitted through diode 23 and through the coupling condenser 28 is again approximately sixty volts due to the voltage drop in the diode 23. If the hundreds stepping switch 11 has registered the three impulses of the code character "3" of the hundreds digit, its switch brushes 15 and 19 will be resting on the stepping switch terminals 65 and 66 to apply the sixty volt bias voltage through the pulse isolating resistances 47, 48 across the pair of electrodes of the neon diode tube gate 24 with the same polarity as the aforementioned code reading pulse which will therefore be transmitted through diode 24 to be coupled by condenser 29 to the diode gate 25.

Similarly, if the tens register stepping switch 12 has been stepped to the stepping switch terminals 67 and 68 and the units register switch has been stepped to the stepping switch terminals 69 and 70, the neon diode gates 25 and 26 will also be biased through isolating resistances 51, 52 and 53, 54, respectively, to become conductive when the code reading pulse is applied thereto. It should now be apparent that a code reading pulse can be transmitted from the pulse source 40 through the series connected diode gates 23—26 and the associated coupling condensers 27—31 to the code reading pulse detector 55 whenever the impulse responsive stepping switches 10—13 for registering the respective code characters have registered the particular code characters to be detected, as indicated by the connections of the associated stepping switch terminals.

In the form of the invention that has been specifically described above, connections were shown to stepping switch terminals 63—70 which would enable the multi-character code detecting system of the invention to detect the registration of the code "1360." Obviously, by changing the respective connections of the diode gate tubes 23—26 to different terminals of the associated stepping switches 10—13, a different multi-character code may be detected. The stepping switch terminals 65, 66 of switch 11 and 66, 68 of switch 12 together with terminals 69, 70 of switch 13 are normally connected to the bias source 44 through resistors 71, 72 for switch 11, resistors 73, 74 for switch 12, and resistors 75, 76 for switch 13 in a manner such as to bias the respective diodes 24, 25 and 26 with a polarity opposite to the polarity of the read pulse source 40. However, as previously mentioned in connection with stepping switch 10, if the brushes of any of the stepping switches 11, 12 or 13 are resting on the associated ones of the above mentioned terminals, the bias voltage applied to the associated diodes 23—26 will be reversed in polarity to be the same as the polarity of the read pulses from the pulse source 40.

The pulse detector 55 has not been specifically described and it should be understood that any suitable indicating, detecting, or pulse utilization device may be employed.

Various modifications may be made within the spirit of the invention and the scope of the appended claims.

What is claimed is:

1. A multi-character code detecting gate system comprising, controllable conducting means for each character of the code to be detected, each of said conducting means requiring a minimum threshold voltage thereacross for conduction, code reading pulse input terminals, code reading pulse output terminals, means for connecting each of said conducting means in series between said input and output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added with the same polarity to said reading pulse voltage, means interconnecting a respective register and a respective conducting means and responsive to the registration of a predetermined character to connect said bias voltage across the respective conducting means with a determined polarity in a manner to add to the voltage amplitude of a code reading pulse to be applied, means for connecting a code reading pulse to said input terminals with said determined polarity, and means interconnecting a respective register and a respective conducting means and responsive when the predetermined code character is not registered to connect said bias voltage across the respective conducting means with a polarity opposite to said determined polarity whereby said code reading pulse may be conducted to said output terminals through said conducting means only when a predetermined combination of code characters is registered in the registers.

2. A multi-character code detecting gate system comprising, a diode for each character of the code to be detected, each of said diodes requiring a minimum threshold voltage thereacross for conduction, code reading pulse input terminals, code reading pulse output terminals, means for connecting each of said diodes in series between said input and output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added with the same polarity to said reading pulse voltage, means interconnecting a respective register and a respective diode and responsive to the registration of a predetermined character to connect said bias voltage across the electrodes of the diode with a determined polarity in a manner to add to the voltage amplitude of a code reading pulse to be applied, means for connecting a code reading pulse to said input terminals with said determined polarity, and means interconnecting a respective register and a respective diode and responsive when the predetermined code character is not registered to connect said bias voltage across the electrodes of the diode with a polarity opposite to said determined polarity whereby said code reading pulse may be conducted to said output terminals through said diodes only when a predetermined combination of code characters is registered in the registers.

3. A multi-character code detecting gate system comprising, a gas tube diode for each character of the code to be detected, each of said diodes requiring a minimum threshold voltage thereacross for conduction, code reading pulse input terminals, code reading pulse output terminals, means for connecting each of said diodes in series between said input and output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added with the same polarity to said reading pulse voltage, means interconnecting a respective register and a respective diode and responsive to the registration of a predetermined character to connect said bias voltage across the electrodes of the diode with a determined polarity in a manner to add to the voltage amplitude of a code reading pulse to be applied, means for connecting a code reading pulse to said input terminals with said determined polarity, and means interconnecting a respective register and a respective diode and responsive when the predetermined code character is not registered to connect said bias voltage across the electrodes of the diode with a polarity opposite to said determined polarity whereby said code reading pulse may be conducted to said output terminals through said diodes only when a predetermined combination of code characters is registered in the registers.

4. A multi-character code detecting gate system comprising a gas tube diode for each character of the code to be detected, each of said diodes requiring a minimum threshold voltage thereacross for conduction, code reading pulse input terminals, code reading pulse output terminals, means for connecting each of said diodes in series between said input and output terminals and including coupling condensers between the input terminals and each diode to the output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added with the same polarity to said reading pulse voltage, means interconnecting a respective register and a respective diode and responsive to the registration of a predetermined character to connect said bias voltage across the electrodes of the diode with a determined polarity in a manner to add to the voltage amplitude of a code reading pulse to be applied, means for connecting a code reading pulse to said input terminals with said determined polarity, and means interconnecting a respective register and a respective diode and responsive when the predetermined code character is not registered to connect said bias voltage across the electrodes of the diode with a polarity opposite to said determined polarity whereby said code reading pulse may be transmitted through the series connected coupling condensers and diodes to said output terminals only when a predetermined combination of code characters is registered in the registers.

5. A multi-character code detecting gate system comprising, a gas tube diode for each character of the code to be detected, each of said diodes requiring a minimum threshold voltage thereacross for conduction, code reading pulse input terminals, code reading pulse output terminals, means for connecting each of said diodes in series between said input and output terminals and including coupling condensers between the input terminals and each diode to the output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added with the same polarity to said reading pulse voltage, means interconnecting a respective register and a respective diode and responsive to the registration of a predetermined character to connect said bias voltage across the electrodes of the diode with a determined polarity in a manner to add to the voltage amplitude of a code reading pulse to be applied, means for connecting a code reading pulse to said input terminals with said determined polarity, means interconnecting a respective register and a respective diode and responsive when the predetermined code character is not registered to connect said bias voltage across the electrodes of the diode with a polarity opposite to said determined polarity whereby said code reading pulse may be transmitted through the series connected coupling condensers and diodes to said output terminals only when a predetermined combination of code characters is registered in the registers, and means for isolating the code reading pulses from said bias voltage source.

References Cited in the file of this patent

UNITED STATES PATENTS 2,401,729 Goldsmith ------------- June 11, 1946